United States Patent
Li et al.

(10) Patent No.: US 10,545,399 B2
(45) Date of Patent: Jan. 28, 2020

(54) REAR PROJECTION SCREEN

(71) Applicant: NANO PRECISION TAIWAN LIMITED, Hsinchu County (TW)

(72) Inventors: Ching-Hsiang Li, Hsin-Chu (TW); Shu-Ping Yang, Hsin-Chu (TW); Fang-Hsuan Su, Hsin-Chu (TW); Chi-Tang Hsieh, Hsin-Chu (TW); Fu-Chiang Hsu, Hsin-Chu (TW)

(73) Assignee: NANO PRECISION TAIWAN LIMITED, Hsinchu County (TW)

( * ) Notice: Subject to any disclaimer, the term of this patent is extended or adjusted under 35 U.S.C. 154(b) by 0 days.

(21) Appl. No.: 16/254,687

(22) Filed: Jan. 23, 2019

(65) Prior Publication Data
US 2019/0227424 A1    Jul. 25, 2019

(30) Foreign Application Priority Data
Jan. 23, 2018 (CN) ............ 2018 1 0064274

(51) Int. Cl.
*G03B 21/62* (2014.01)
*G03B 21/625* (2014.01)
*G02B 5/02* (2006.01)
*G03B 21/10* (2006.01)

(52) U.S. Cl.
CPC ......... *G03B 21/62* (2013.01); *G02B 5/0242* (2013.01); *G02B 5/0278* (2013.01); *G03B 21/10* (2013.01); *G03B 21/625* (2013.01)

(58) Field of Classification Search
CPC ........ G03B 21/65; G03B 21/62; G03B 21/10; G02B 5/0242; G02B 5/0278

USPC ......................................... 359/453
See application file for complete search history.

(56) References Cited

U.S. PATENT DOCUMENTS

| | | | | |
|---|---|---|---|---|
| 3,279,314 A | * | 10/1966 | Miller | G03B 21/625 353/70 |
| 3,712,707 A | * | 1/1973 | Henkes, Jr. | G03B 21/625 359/448 |
| 4,679,900 A | * | 7/1987 | McKechnie | G03B 21/625 359/453 |
| 6,271,965 B1 | * | 8/2001 | Miyata | G03B 21/625 359/453 |

(Continued)

FOREIGN PATENT DOCUMENTS

| CN | 1378660 A | 11/2002 |
|---|---|---|
| CN | 1666116 A | 9/2005 |

(Continued)

*Primary Examiner* — Clayton E. LaBalle
*Assistant Examiner* — Kevin C Butler

(57) ABSTRACT

A rear projection screen includes a prism film, a first diffusion layer, a second diffusion layer and a light absorbing film sequentially disposed along a first direction. The prism film includes a first light-transmitting substrate and prism structures, wherein the prism structures are disposed on a surface of the first light-transmitting substrate away from the first diffusion layer. The prism structures receive an image beam and guide the image beam to be transmitted along the first direction. The first diffusion layer and the second diffusion layer have different refractive indexes. There are light-absorbing structures disposed in the light absorbing film, and the light-absorbing structures are arranged spaced apart from each other.

19 Claims, 8 Drawing Sheets

(56) References Cited

U.S. PATENT DOCUMENTS

| | | | |
|---|---|---|---|
| 6,417,966 B1* | 7/2002 | Moshrefzadeh | G03B 21/62 359/453 |
| 6,466,368 B1* | 10/2002 | Piepel | G03B 21/625 359/452 |
| 6,556,347 B1* | 4/2003 | Murayama | G03B 21/62 359/453 |
| 6,636,355 B2* | 10/2003 | Moshrefzadeh | G03B 21/625 359/453 |
| 6,747,796 B1* | 6/2004 | Dorling | G02B 5/0226 359/452 |
| 6,831,714 B2* | 12/2004 | Masaki | G02B 6/0051 349/112 |
| 6,984,046 B2* | 1/2006 | Abe | G03B 21/625 359/457 |
| 6,995,907 B2* | 2/2006 | Osawa | G03B 21/625 359/453 |
| 7,184,210 B2* | 2/2007 | Thomas | B29C 70/745 359/443 |
| 7,271,955 B2* | 9/2007 | Osawa | G02B 3/08 359/453 |
| 7,317,572 B2* | 1/2008 | Sekiguchi | G03B 21/625 359/453 |
| 7,609,443 B2* | 10/2009 | Bertin-Mourot | G03B 21/625 359/452 |
| 7,656,580 B2* | 2/2010 | Chang | G02B 5/0215 359/452 |
| 7,727,626 B2* | 6/2010 | Inokuma | C03C 17/3405 359/443 |
| 8,004,760 B2* | 8/2011 | Liu | G03B 21/62 353/74 |
| 8,068,277 B2* | 11/2011 | Park | G03B 21/60 359/449 |
| 9,274,255 B2* | 3/2016 | Yamamoto | B29D 11/00798 |
| 2001/0005282 A1* | 6/2001 | Etori | G03B 21/62 359/453 |
| 2001/0050811 A1* | 12/2001 | Miyata | G03B 21/625 359/453 |
| 2005/0141086 A1* | 6/2005 | Maruta | G03B 21/60 359/449 |
| 2005/0141091 A1* | 6/2005 | Maruta | G03B 21/60 359/485.04 |
| 2005/0152032 A1* | 7/2005 | Olofson | C08F 290/067 359/453 |
| 2005/0213245 A1* | 9/2005 | Katsura | G02B 5/021 359/443 |
| 2007/0159691 A1* | 7/2007 | Fukano | G03B 21/625 359/453 |
| 2008/0102230 A1* | 5/2008 | Murata | G02B 5/0242 428/29 |
| 2008/0260336 A1* | 10/2008 | Hwang | G02B 6/0053 385/120 |
| 2009/0091824 A1* | 4/2009 | Yamashita | G02B 5/0242 359/453 |
| 2009/0190211 A1* | 7/2009 | Kodama | G02B 5/0242 359/457 |
| 2009/0316261 A1* | 12/2009 | Garcia-Leiner | B32B 27/04 359/453 |
| 2012/0200930 A1* | 8/2012 | Yamamoto | G02B 5/0231 359/599 |
| 2012/0268826 A1* | 10/2012 | Umeda | G02B 5/0231 359/599 |
| 2013/0329401 A1* | 12/2013 | Yamamoto | F21V 13/02 362/97.2 |
| 2016/0238863 A1* | 8/2016 | Kashiwagi | G02F 1/133504 |
| 2018/0284593 A1* | 10/2018 | Li | G02B 5/003 |

FOREIGN PATENT DOCUMENTS

| | | | | |
|---|---|---|---|---|
| CN | 1873527 | A | 12/2006 | |
| CN | 2862114 | Y | 1/2007 | |
| CN | 2862114 | * | 7/2007 | B32B 33/00 |
| CN | 102778710 | * | 11/2012 | G02B 5/02 |
| CN | 102778710 | A | 11/2012 | |
| CN | 103748514 | A | 4/2014 | |
| CN | 107290921 | * | 10/2017 | G03B 21/602 |
| CN | 107290921 | A | 10/2017 | |
| JP | 2004093588 | * | 3/2004 | G02B 3/00 |
| TW | M361635 | U | 7/2009 | |
| TW | I385468 | * | 2/2013 | C08F 2/44 |
| TW | I385468 | B | 2/2013 | |

\* cited by examiner

REAR PROJECTION SCREEN

CROSS-REFERENCE TO RELATED APPLICATION

This application claims the priority benefit of CN 201810064274.5, filed on 2018 Jan. 23. The entirety of the above-mentioned patent application is hereby incorporated by reference herein and made a part of this specification.

FIELD OF THE INVENTION

The invention relates to a projection screen, and more particularly to a rear projection screen.

BACKGROUND OF THE INVENTION

The conventional rear projection screen has opposite viewing side and rear side, wherein the viewing side faces the viewer while the rear side faces the projector. The viewing side has a prism structure, and the rear side has a diffusion layer. The projection beam provided by the projector passes through the diffusion layer and is refracted by the prism structure to the viewer. A light absorbing layer is arranged on the upward facing surface of the prism structure, and the ambient light can be absorbed by the light absorbing layer or pass through the prism structure without being reflected by the rear projection screen to the viewer, so the contrast of the image can be improved.

However, the above-mentioned rear projection screen can only be applied to the projection mode of the hanging type projector because the light absorbing layer is arranged on the upward facing surface of the prism structure. Furthermore, since the diffusion layer faces the projector rather than the viewer, the quality of the image is poor, and the so-called hot spot phenomenon is easy to occur.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a rear projection screen to improve the quality of image.

Other advantages and objects of the invention may be further illustrated by the technical features broadly embodied and described as follows.

In order to achieve one or a portion of or all of the objects or other objects, an embodiment of the invention provides a rear projection screen, used to receive an image beam. The rear projection screen includes a prism film, a first diffusion layer, a second diffusion layer and a light absorbing film sequentially disposed along a first direction. The prism film includes a first light-transmitting substrate and a plurality of prism structures, wherein the prism structures are disposed on a surface of the first light-transmitting substrate far away from the first diffusion layer, and the prism structures receive the image beam and guide the image beam to be transmitted along the first direction. The first diffusion layer and the second diffusion layer have different refractive indexes. There are a plurality of light-absorbing structures disposed in the light absorbing film, and the light-absorbing structures are arranged spaced apart from each other.

In the rear projection screen of the embodiment of the invention, since the image beam sequentially passes through the first diffusion layer and the second diffusion layer after being deflected by the prism structure, the image beam can be uniformly diffused, so that the quality of the image can be improved and the hot spot phenomenon can be reduced. In addition, since the light absorbing structures of the light absorbing film are not disposed on the prism structures, the rear projection screen of the embodiment of the invention is not only suitable for the projection mode of the hanging type projector but also the projection mode of the desktop projector.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
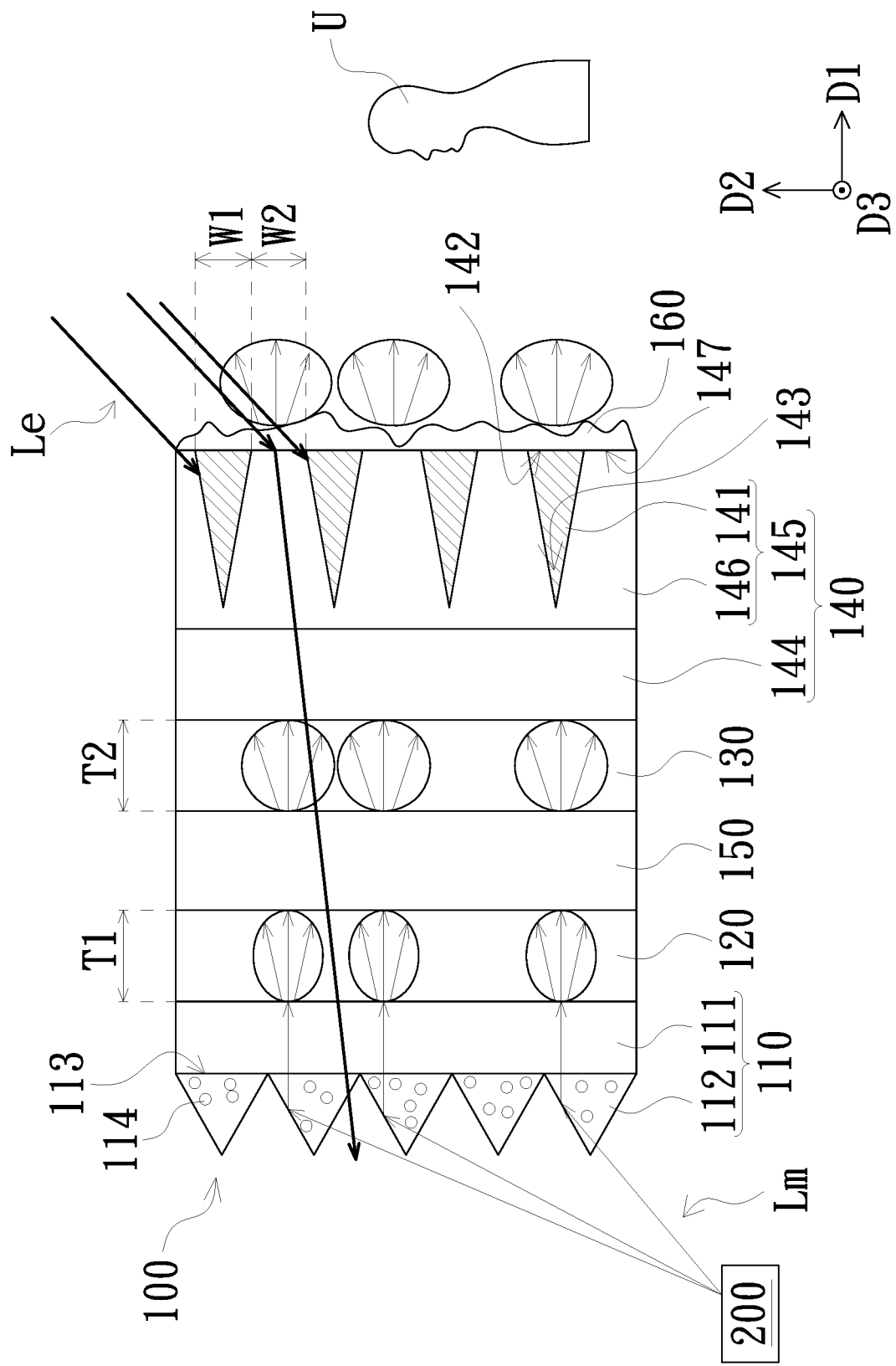
FIG. 1 is a schematic diagram of the use of a rear projection screen according to an embodiment of the invention.

FIG. 1 is a schematic diagram of the use of a rear projection screen according to an embodiment of the invention. Referring to FIG. 1, the rear projection screen 100 of the embodiment is configured to receive an image beam Lm, and the image beam Lm is provided by the projector 200. The rear projection screen 100 includes a prism film 110, a first diffusion layer 120, a second diffusion layer 130, and a light absorbing film 140 that are sequentially arranged along a first direction D1.

Figure 2:
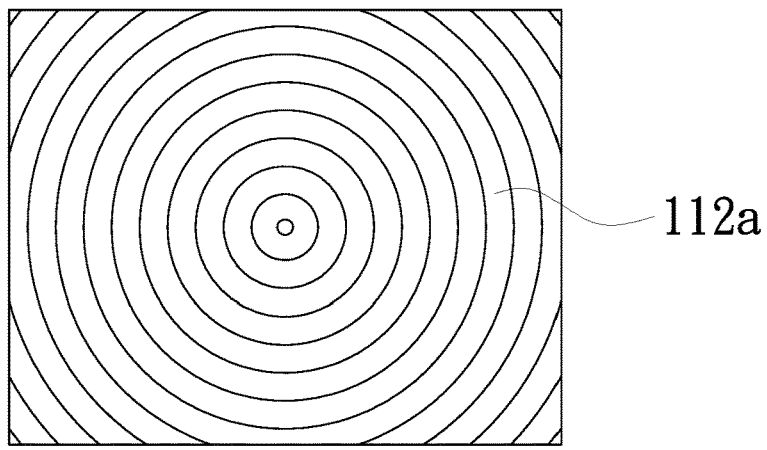
FIG. 2 is a schematic diagram of the distribution of a plurality of prism structures according to an embodiment of the invention.

The above-mentioned prism film 110 includes a first light-transmitting substrate 111 and a plurality of prism structures 112. The prism structures 112 are disposed on a surface 113 of the first light-transmitting substrate 111 away from the first diffusion layer 120, and the prism structures 112 receive the image beam Lm projected from the projector 200 and guide the image beam Lm to be transmitted in the first direction D1. The material of the first light-transmitting substrate 111 may be polyethylene terephthalate (PET) or other translucent material. Diffusion particles 114 may be disposed in each of the prism structures 112 to diffuse the image beam Lm. The prism structures 112 of the embodiment are, for example, triangular. The prism structures 112 are arranged parallel to each other along a second direction D2, and each of the prism structures 112 extends along a third direction D3. That is, the long axis of each prism structure 112 is parallel to the third direction D3. In the embodiment, the first direction D1, the second direction D2, and the third direction D3 are, for example, perpendicular to each other. In addition, the invention does not limit the specific shape and arrangement of the prism structures 112. For example, in another embodiment shown in FIG. 2, the prism structures 112a are, for example, Fresnel lenses structure distributed in concentric circles.

Figure 3:
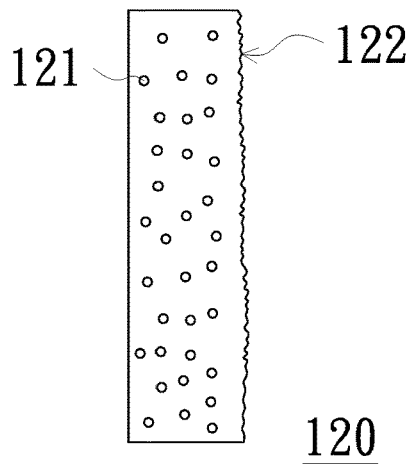
FIG. 3 is a schematic diagram of the first diffusion layer according to an embodiment of the invention.

FIG. 3 is a schematic diagram of the first diffusion layer according to an embodiment of the invention. Referring to FIG. 3, a plurality of first diffusion particles 121 may be disposed in the first diffusion layer 120, and the surface 122 of the first diffusion layer 120 facing the second diffusion layer 130 may be a rough surface and thus have a diffusion effect. The particle diameters of these first diffusion particles range, for example, between 1 µm and 50 µm. The thickness T1 of the first diffusion layer 120 is, for example, 5 µm to 100 µm. The thickness T1 is the distance between two opposite surfaces of the first diffusion layer 120 in the first direction D1.

Figure 4:
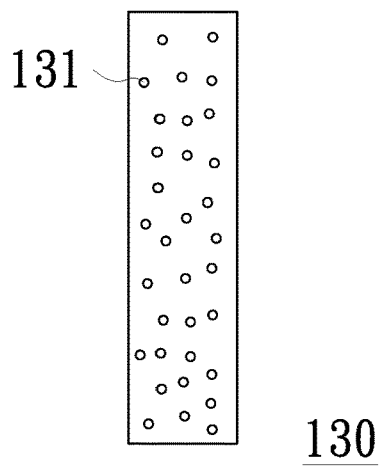
FIG. 4 is a schematic diagram of the second diffusion layer according to an embodiment of the invention.
Figure 5A:
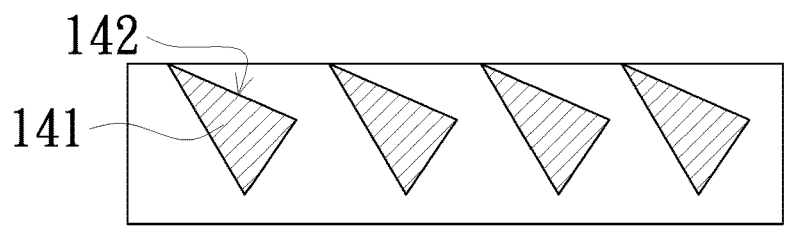
FIG. 5A to FIG. 5F are schematic diagrams of various embodiments of light-absorbing structures of the invention.
Figure 5B:
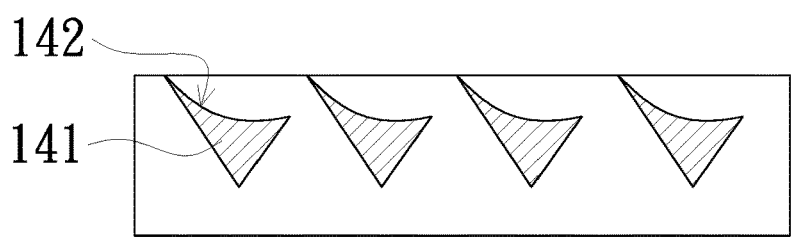
Figure 5C:
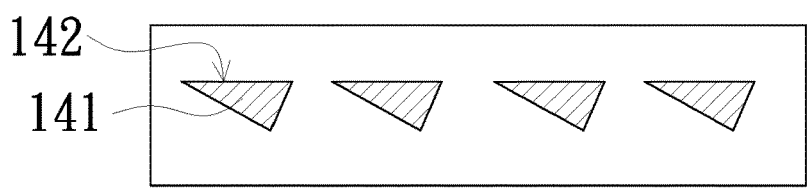
Figure 5D:
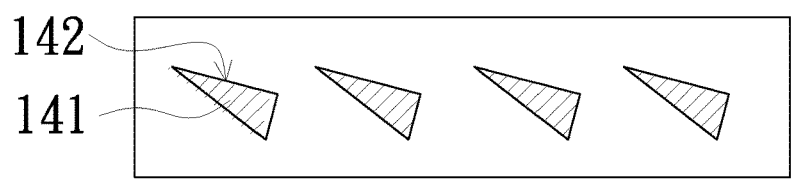
Figure 5E:
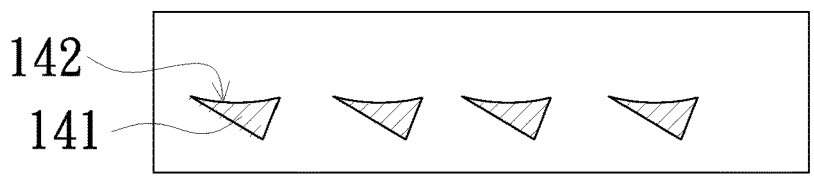
Figure 5F:
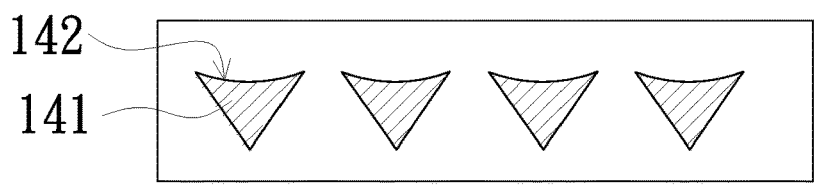

FIG. 4 is a schematic diagram of the second diffusion layer according to an embodiment of the invention. Referring to FIG. 4, a plurality of second diffusion particles 131 may be disposed in the second diffusion layer 130. The particle diameters of these second diffusion particles 131 range, for example, from 200 nm to 800 nm. The thickness T2 of the second diffusion layer 130 is, for example, 7 µm to 18 µm, and preferably 10 µm to 14 µm. In addition, the color of the second diffusion layer 130 is white, for example. The thickness T2 is the distance between two opposite surfaces of the second diffusion layer 130 in the first direction D1.

Referring to FIG. 1 again, the above-mentioned first diffusion layer 120 and the second diffusion layer 130 have different refractive indexes and both have light transmission properties. In one embodiment, the first diffusion layer 120 is, for example, cured from a first UV curing material coated on the first light-transmitting substrate 111, and the second diffusion layer 130 is, for example, cured from a second UV curing material coated on the light absorbing film 140. Wherein the compositions of the first UV curing material and the second UV curing material are different, so that the refractive indices of the first diffusion layer 120 and the second diffusion layer 130 are different. In addition, the rear projection screen 100 of the embodiment further includes, for example, a bonding layer 150, which is bonded between the first diffusion layer 120 and the second diffusion layer 130. The bonding layer 150 may be an optical clear adhesive, but not limited thereto. It should be noted that, the invention does not limit the use of the bonding layer 150 to combine the first diffusion layer 120 and the second diffusion layer 130. In another embodiment, the first diffusion layer 120 and the second diffusion layer 130 may also be directly combined with each other.

A plurality of light-absorbing structures 141 are disposed in the above-mentioned light absorbing film 140, and the light-absorbing structures 141 are arranged spaced apart from each other. The ambient light Le can pass through the gaps between the light-absorbing structures 141 or be absorbed by the light-absorbing structures 141, so that the ambient light Le can be prevented from reflecting to the viewer U. In the embodiment, the light absorbing film 140 includes, for example, a light-absorbing structure layer 145, and the light-absorbing structure layer 145 includes a UV curing material 146 and the light-absorbing structures 141 embedded in the UV curing material 146; that is, the gaps between the light-absorbing structures 141 are filled with the UV curing material 146. In other words, the light-absorbing structures 141 are disposed in the light-absorbing structure layer 145. In addition, the light-absorbing structures 141 are, for example, columnar structures arranged parallel to each other along the second direction D2, and each light-absorbing structure 141 extends along the third direction D3, that is, the long axis of each light-absorbing structure 141 is parallel to the third direction D3. The light absorbing film 140 may further include a second light-transmitting substrate 144, and the second light-transmitting substrate 144 is disposed between the light-absorbing structure layer 145 and the second diffusion layer 130. The UV curing material 146 and the second diffusion layer 130 are respectively formed on the second light-transmitting substrate 144, for example. The material of the second light-transmitting substrate 144 may be PET or other translucent material. In addition, each of the light-absorbing structures 141 has a bottom 142 and an apex 143 opposite to each other. In the embodiment, the apex 143 of each light-absorbing structure 141 is toward the second light-transmitting substrate 144, for example.

The angle of the apex 143 ranges, for example, between 3 degrees and 120 degrees, and the width of the bottom 142 is W1. The spacing between the two bottoms 142 of the adjacent two light-absorbing structures 141 is W2, wherein 5 μm≤W1≤100 μm, and W2≥½W1 (W2 is greater than or equal to one-half W1), that is, W2≥2.5 μm. In addition, the number of the light-absorbing structures 141 covered by the orthographic projection of each of the prism structures 112 on the light absorbing film 140 is between 0 and 200, and the numbers of the light-absorbing structures 141 covered by the orthographic projections of the prism structures 112 on the light absorbing film 140 are different. That is, the orthographic projections of some prism structures 112 on the light absorbing film 140 may not cover any light-absorbing structure 141, and the orthographic projections of some other prism structures 112 on the light absorbing film 140 may cover the light-absorbing structures 141, and the number of covered light-absorbing structures 141 is, for example, less than or equal to 200. The numbers of the light-absorbing structures 141 covered by the orthographic projections of different prism structures 112 on the light absorbing film 140 are not necessarily the same. In other embodiments, the orthographic projections of the prism structures 112 on the light absorbing film 140 may cover the same number of the light-absorbing structures 141, and the invention is not limited thereto.

In the embodiment, the bottom 142 of the light-absorbing structure 141 is, for example, aligned with the side edge 147 of the UV curing material 146. However, in other embodiments, the bottom 142 of the light-absorbing structure 141 may also be spaced from the side edge 147 of the UV curing material 146. The bottom 142 may be a flat surface, an inclined surface, or a curved surface. FIG. 5A to FIG. 5F illustrate other possible implementations of the light-absorbing structures 141, but the invention is not limited thereto.

Figure 6:
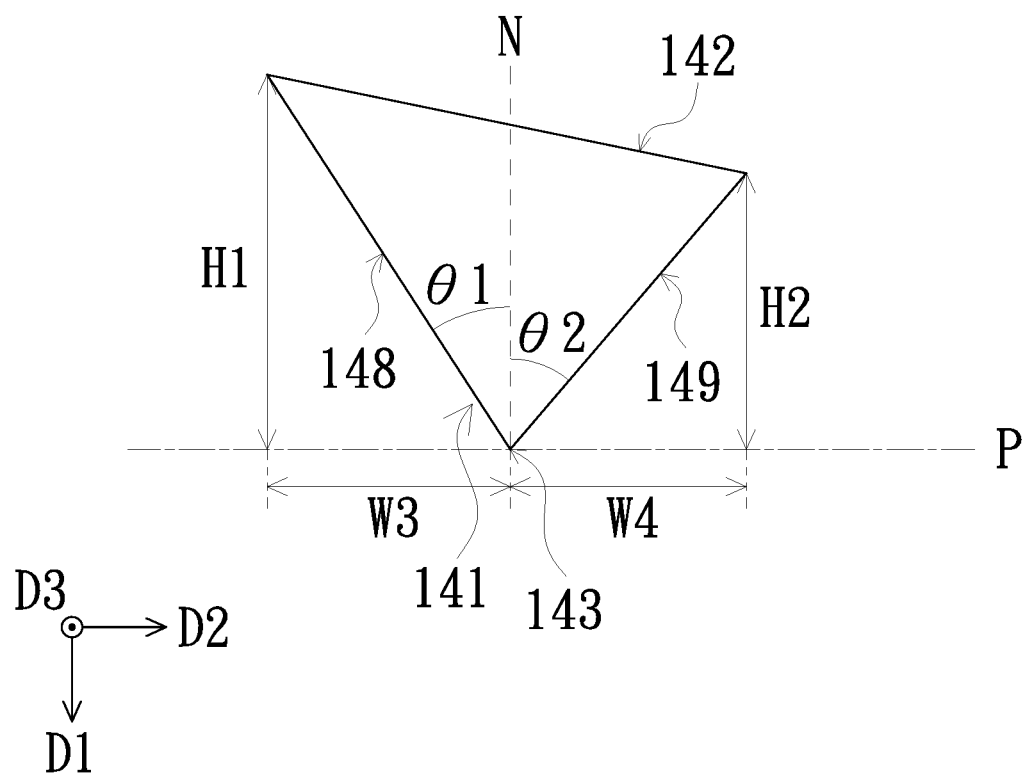
FIG. 6 is a schematic diagram of a light-absorbing structure according to another embodiment of the invention.

FIG. 6 is a schematic diagram of a light-absorbing structure according to another embodiment of the invention. Please refer to FIG. 6, according to various possible implementations of the light-absorbing structures 141, each light-absorbing structure 141 has two opposite side surfaces 148 and 149. The two opposite side surfaces 148 and 149 are respectively connected to two opposite sides of the bottom 142, and the orthogonal projection widths W3 and W4 of the two opposite side surfaces 148 and 149 on a reference plane P may be the same or different, wherein the reference plane P is a plane formed by the apex 143 and the second direction D2 and the third direction D3. The included angle θ1 between the side surface 148 and the plane N perpendicular to the reference plane P may be greater than, less than, or equal to the included angle θ2 between the side surface 149 and the plane N. In addition, the distance H1 between a connection point of the side surface 148, which is connected to the bottom 142, and the reference plane P may be greater than, less than or equal to the distance H2 between a connection point of the side surface 149, which is connected to the bottom 142, and the reference plane P.

According to the above, when the image beam Lm is incident on the rear projection screen 100 of FIG. 1, the rear projection screen 100 guides the image beam Lm from the projector 200 to the viewer U through the prism structures 112, and the image beam Lm is diffused by the first diffusion layer 120 and the second diffusion layer 150 in sequence along the first direction D1 after the image beam Lm is deflected by the prism structures 112. Since the diffusion layers have different compositions, when the image beam Lm passes through the first diffusion layer 120 and the second diffusion layer 130 in sequence, the diffusion angle of the image beam Lm may gradually increase along the first direction D1, so that the quality of the image can be improved and the hot spot phenomenon can be reduced. Additionally, a light absorbing film 140 is disposed on a side of the second diffusion layer 130 away from the first diffusion layer 120 to prevent the ambient light Le from reflecting to the viewer U. In this way, the conventional light absorbing layer need not be disposed on the prism structures 112. Therefore, the rear projection screen of the embodiment of the invention is not only suitable for the projection mode of desktop projector (as shown in FIG. 1), but also can be applied to the projection mode of the hanging type projector. In addition, the rear projection screen 100 may further include a diffusion material layer 160 disposed on the surface 147 of the light absorbing film 140 away from the second diffusion layer 130, that is, on the surface of the light absorbing film 140 facing the viewer U, thereby improving the diffusion effect of the image beam Lm.

Figure 7:
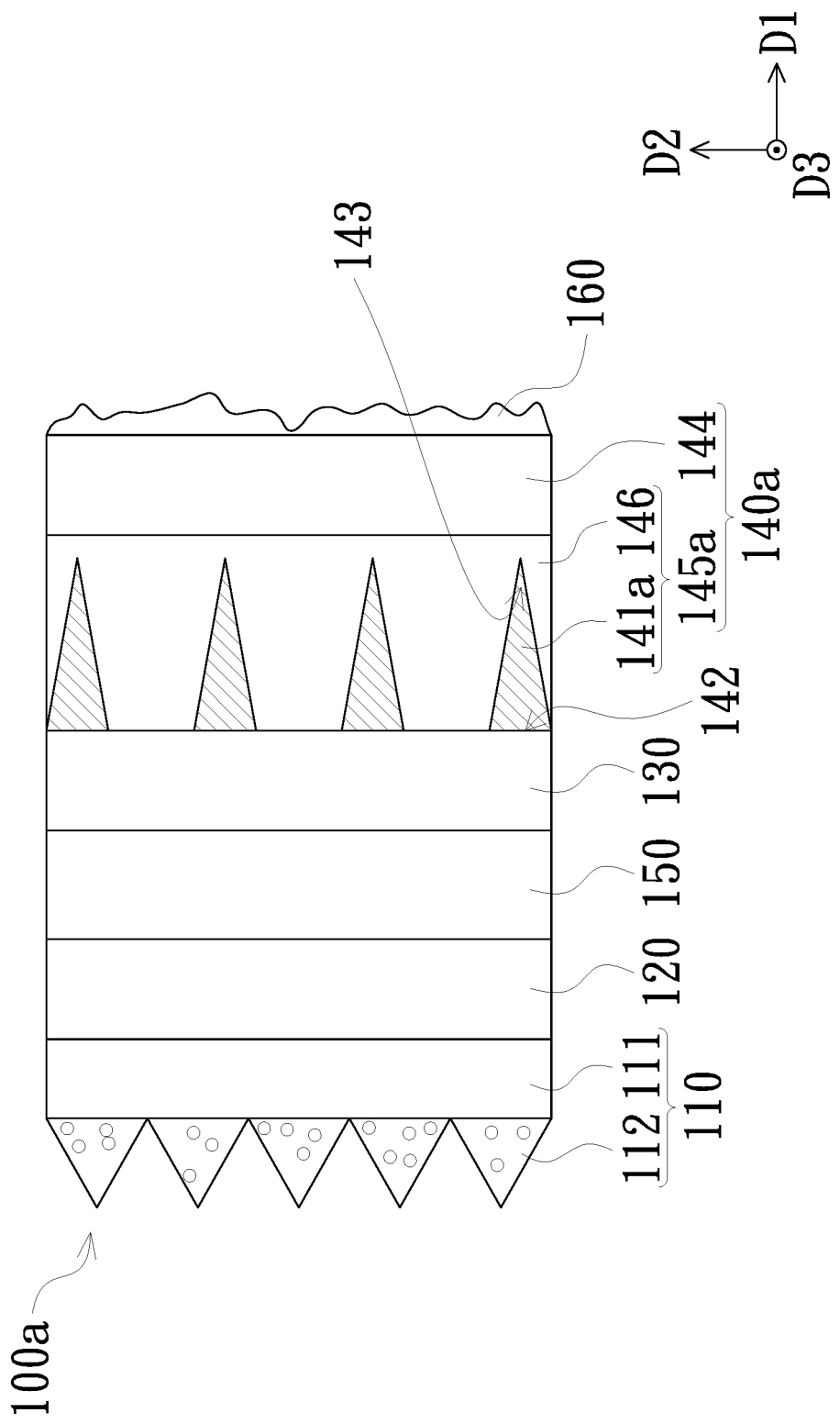
FIG. 7 is a schematic diagram of a rear projection screen according to another embodiment of the invention.

Although the light-absorbing structures 141 are described above with the apex 143 toward the second diffusion layer 130, in another embodiment, the bottom 42 may be toward the second diffusion layer 130. FIG. 7 is a schematic diagram of a rear projection screen according to another embodiment of the invention. Referring to FIG. 7, the rear projection screen 100a of the embodiment is similar to the rear projection screen 100 described above. The main difference is that in the rear projection screen 100a of the embodiment, the light-absorbing structures 141a are with the bottom 142 toward the second diffusion layer 130. Specifically, the light absorbing film 140a of the embodiment includes a second light-transmitting substrate 144 and a light-absorbing structure layer 145a. The light-absorbing structure layer 145a is disposed between the second light-transmitting substrate 144 and the second diffusion layer 130. The light-absorbing structures 141a are disposed within the UV curing material 146 of the light-absorbing structure layer 145a, and the apexes 143 of the light-absorbing structures 141a are toward the second light-transmitting substrate 144.

Figure 8:
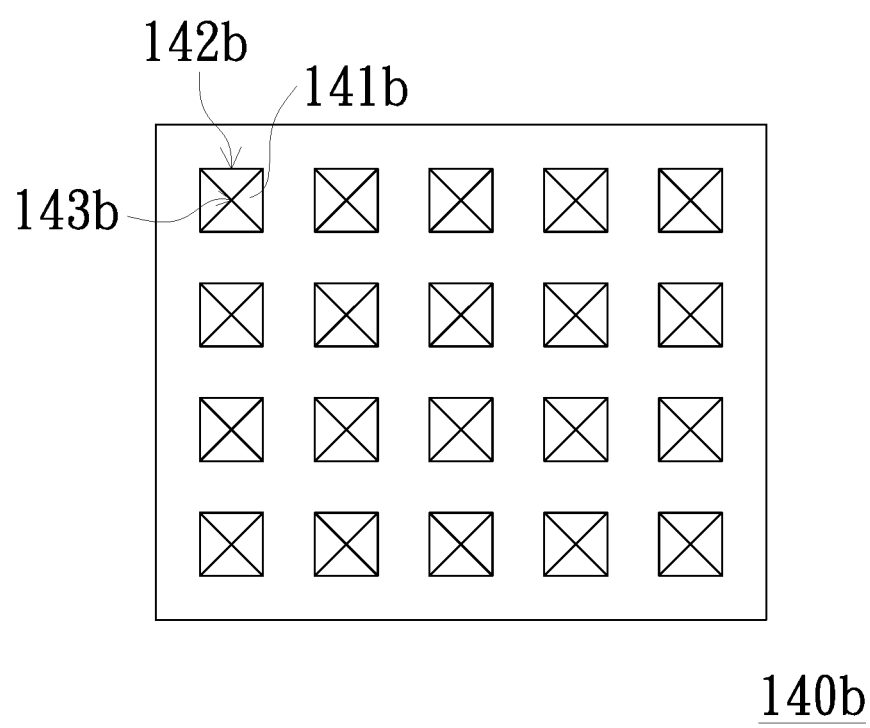
FIG. 8 is a schematic diagram of a light absorbing film according to an embodiment of the invention.

Although the light-absorbing structures 141 and 141a described above are exemplified as columnar structures arranged parallel to each other along the second direction D2, the invention is not limited thereto. For example, in the light absorbing film 140b of another embodiment shown in FIG. 8, the light-absorbing structures 141b are arranged in an array within the light absorbing film 140a. The light-absorbing structures 141b are, for example, pyramid-shaped, and the light-absorbing structures 141b may be with the apexes 143b toward the second diffusion layer 130 or with the bottom 142b toward the second diffusion layer 130.

Figure 9:
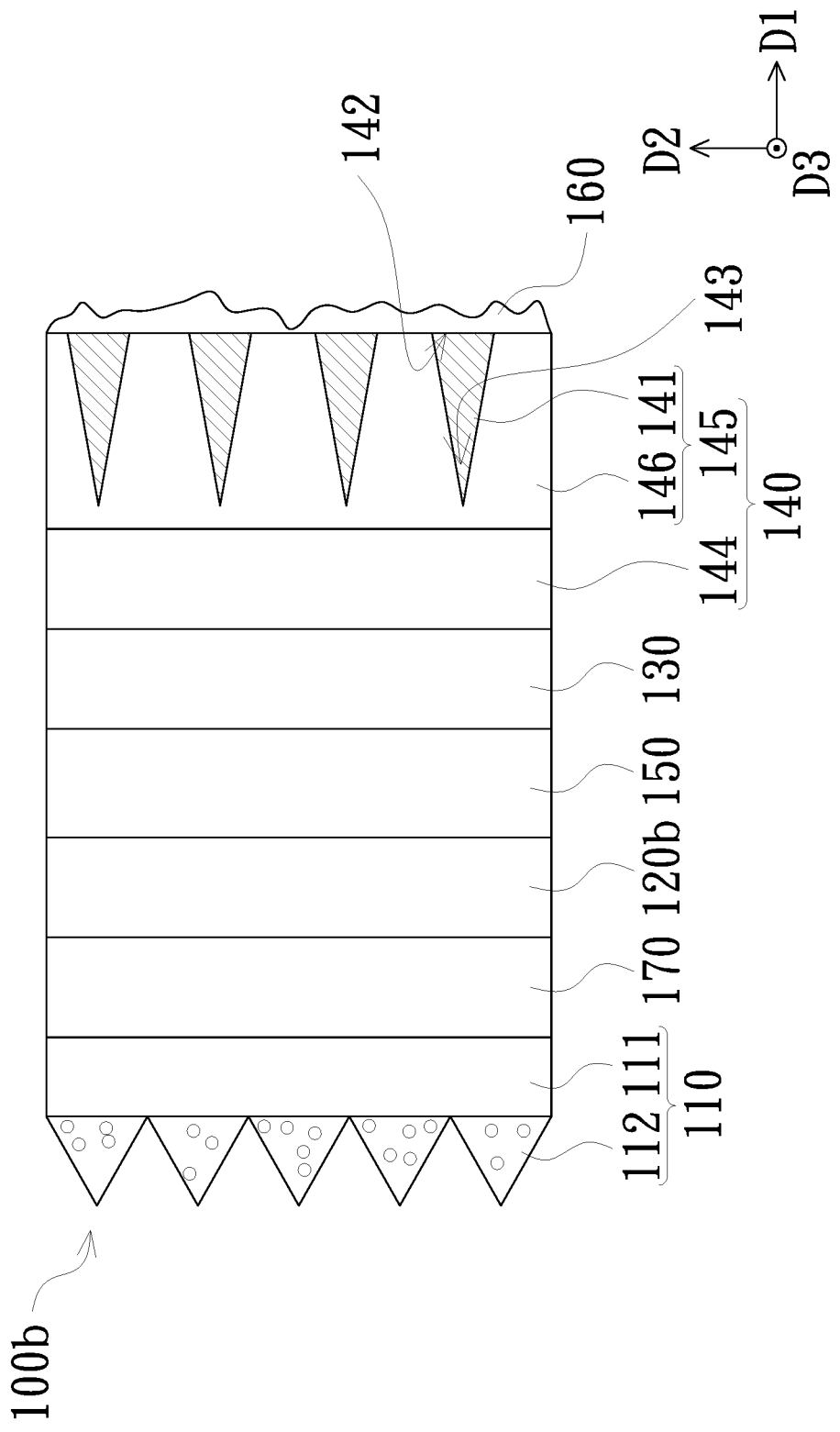
FIG. 9 is a schematic diagram of a rear projection screen according to another embodiment of the invention.
Figure 10:
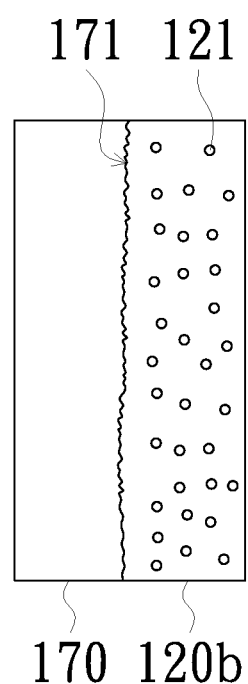
FIG. 10 is a schematic diagram of a first diffusion layer and a third diffusion layer according to an embodiment of the invention.

FIG. 9 is a schematic diagram of a rear projection screen according to another embodiment of the invention. Referring to FIG. 9, the rear projection screen 100b of the embodiment is similar to the rear projection screen 100 described above. The main difference is that the rear projection screen 100b of the embodiment further includes a third diffusion layer 170 disposed between the first diffusion layer 120b and the first light-transmitting substrate 111 of the prism film 110, and the refractive index of the third diffusion layer 170 is different from the refractive index of the first diffusion layer 120b. The third diffusion layer 170 is, for example, cured from a third UV curing material coated on the first light-transmitting substrate 111, and the first diffusion layer 120b is, for example, cured from a first UV curing material coated on the third diffusion layer 170. Wherein the compositions of the first UV curing material and the third UV curing material are different, so that the refractive indices of the first diffusion layer 120b and the third diffusion layer 170 are different. The compositions of the second UV curing material and the third UV curing material are different, so that the refractive indices of the second diffusion layer 130 and the third diffusion layer 170 are different. In addition, the first diffusion layer 120b and the third diffusion layer 170 may be selectively disposed with light-expanding structures such as diffusion particles and rough surfaces. In an embodiment as shown in FIG. 10, a plurality of first diffusion particles 121 are, for example, disposed in the first diffusion layer 120b, and the surface 171 of the third diffusion layer 170 facing the first diffusion layer 120b is, for example, a rough surface, and the refractive index of the third diffusion layer 170 is smaller than the refractive index of the first diffusion layer 120b. When the image beam is incident on the rear projection screen 100b, the image beam is first guided by the prism film 110 to be transmitted along the first direction D1, and sequentially passes through the third diffusion layer 170, the first diffusion layer 120b, and the second diffusion layer 130, and finally penetrates the light absorbing film 140. Since the diffusion layers have different compositions, when the image beam passes through the third diffusion layer 170, the first diffusion layer 120b, and the second diffusion layer 130 in sequence, the diffusion angle of the image beam can gradually increase along the first direction D1.

In summary, in the rear projection screen of the embodiment of the invention, the image beam from the projector sequentially passes through the first diffusion layer and the second diffusion layer after being deflected by the prism structure, so that the image beam can be uniformly diffused to reduce the hot spot phenomenon. Therefore, in addition to achieve the functions of a large viewing angle, high luminance, and high contrast, the rear projection screen of the embodiment of the invention can also improve the quality of the image. In addition, since the light-absorbing structures of the light absorbing film are not disposed on the prism structures, the rear projection screen of the embodiment of the invention is not only suitable for the projection mode of the hanging type projector but also the projection mode of the desktop projector.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A rear projection screen used to receive an image beam, and the rear projection screen comprising: a prism film, a first diffusion layer, a second diffusion layer and a light absorbing film sequentially disposed along a first direction, wherein
   the prism film comprises a first light-transmitting substrate and a plurality of prism structures, wherein the prism structures are disposed on a surface of the first light-transmitting substrate away from the first diffusion layer, and the prism structures receive the image beam and guide the image beam to be transmitted along the first direction; wherein a plurality of diffusion particles are disposed in each of the prism structures;
   the first diffusion layer and the second diffusion layer have different refractive indexes; and
   a plurality of light-absorbing structures are disposed in the light absorbing film, and the light-absorbing structures are arranged spaced apart from each other.

2. The rear projection screen according to claim 1, wherein a plurality of first diffusion particles are disposed in the first diffusion layer, and a surface of the first diffusion layer facing the second diffusion layer is a rough surface.

3. The rear projection screen according to claim 1, further comprising a third diffusion layer disposed between the first diffusion layer and the first light-transmitting substrate of the prism film, wherein the third diffusion layer and the first diffusion layer have different refractive indexes.

4. The rear projection screen according to claim 1, further comprising a bonding layer bonded between the first diffusion layer and the second diffusion layer.

5. The rear projection screen according to claim 1, wherein a plurality of second diffusion particles are disposed in the second diffusion layer, and a color of the second diffusion layer is white.

6. The rear projection screen according to claim 5, wherein particle diameters of the second diffusion particles range between 200 nm and 800 nm.

7. The rear projection screen according to claim 1, wherein the light-absorbing structures are arrayed in the light absorbing film.

8. The rear projection screen according to claim 1, wherein the light-absorbing structures are columnar structures arranged parallel to each other along a second direction, the light-absorbing structures extend along a third direction, the first direction, the second direction and the third direction are perpendicular to each other, and each of the light-absorbing structures has a bottom and an apex opposite to each other.

9. The rear projection screen according to claim 8, wherein the light absorbing film comprises a second light-transmitting substrate and a light-absorbing structure layer, the second light-transmitting substrate is disposed between the light-absorbing structure layer and the second diffusion layer, the light-absorbing structures are disposed in the light-absorbing structure layer, and the apexes of the light-absorbing structures are toward the second light-transmitting substrate.

10. The rear projection screen according to claim 8, wherein the light absorbing film comprises a second light-transmitting substrate and a light-absorbing structure layer, the light-absorbing structure layer is disposed between the second light-transmitting substrate and the second diffusion layer, the light-absorbing structures are disposed in the light-absorbing structure layer, and the apexes of the light-absorbing structures are toward the second light-transmitting substrate.

11. The rear projection screen according to claim 8, wherein an angle of the apex ranges between 3 degrees and 120 degrees, a width of the bottom is W1, a spacing between two bottoms of adjacent two light-absorbing structures is W2, 5 µm≤W1≤100 µm, and W2≥½W1.

12. The rear projection screen according to claim 8, wherein the prism structures are triangular columns, the prism structures are arranged parallel to each other along the second direction and each of the prism structures extends along the third direction.

13. The rear projection screen according to claim 8, wherein each of the light-absorbing structures has two opposite side surfaces, and the two opposite side surface are respectively connected to two opposite sides of the bottom, wherein widths of orthogonal projections of the two opposite side surfaces on a reference plane may be the same or different, and the reference plane is formed by the second direction and the third direction.

14. The rear projection screen according to claim 1, wherein the prism structures are triangular columns or distributed in concentric circles.

15. The rear projection screen according to claim 1, wherein a number of light-absorbing structures covered by an orthographic projection of each of the prism structures on the light absorbing film is between 0 and 200, and the numbers of light-absorbing structures covered by the orthographic projections of the prism structures on the light absorbing film are different or the same.

16. The rear projection screen according to claim 1, wherein the light absorbing film comprises a light-absorbing structure layer, and the light-absorbing structure layer comprises a UV curing material and the light-absorbing structures embedded in the UV curing material.

17. The rear projection screen according to claim 1, further comprising a diffusion material layer disposed on a surface of the light absorbing film away from the second diffusion layer.

18. A rear projection screen used to receive an image beam, and the rear projection screen comprising: a prism film, a first diffusion layer, a second diffusion layer, a third diffusion layer and a light absorbing film sequentially disposed along a first direction, wherein
the prism film comprises a first light-transmitting substrate and a plurality of prism structures, wherein the prism structures are disposed on a surface of the first light-transmitting substrate away from the first diffusion layer, and the prism structures receive the image beam and guide the image beam to be transmitted along the first direction;
the first diffusion layer and the second diffusion layer have different refractive indexes, the third diffusion layer is disposed between the first diffusion layer and the first light-transmitting substrate of the prism film and has a rough surface facing the first diffusion layer, wherein the refractive index of the third diffusion layer is smaller than the refractive index of the first diffusion layer; and
a plurality of light-absorbing structures are disposed in the light absorbing film, and the light-absorbing structures are arranged spaced apart from each other.

19. The rear projection screen according to claim 18, wherein particle diameters of the first diffusion particles range between 1 µm and 50 µm.

* * * * *